US012722255B2

(12) United States Patent
Philbrook

(10) Patent No.: US 12,722,255 B2
(45) Date of Patent: Sep. 1, 2026

(54) MULTIPURPOSE ROTATIONAL TOOL

(71) Applicant: Mark C. Philbrook, North Saanich (CA)

(72) Inventor: Mark C. Philbrook, North Saanich (CA)

( * ) Notice: Subject to any disclaimer, the term of this patent is extended or adjusted under 35 U.S.C. 154(b) by 451 days.

(21) Appl. No.: 18/209,928

(22) Filed: Jun. 14, 2023

(65) Prior Publication Data

US 2023/0405773 A1 Dec. 21, 2023

Related U.S. Application Data

(60) Provisional application No. 63/353,477, filed on Jun. 17, 2022.

(51) Int. Cl.
*B25B 15/02* (2006.01)
*B25B 23/00* (2006.01)

(52) U.S. Cl.
CPC .......... *B25B 15/02* (2013.01); *B25B 23/0085* (2013.01)

(58) Field of Classification Search
CPC . B25B 23/0035; B25B 23/0085; B25B 15/02; B25B 15/04; B25B 13/5091; H01R 43/033
USPC ... 81/436, 437, 124.5, 180.2, 185, 442, 457; 7/138, 107, 108
See application file for complete search history.

(56) References Cited

U.S. PATENT DOCUMENTS 384,043 A * 6/1888 Kiblinger ................ B25B 15/02 81/439
870,034 A * 11/1907 Hopkins ............... B25B 15/008 81/440
3,452,373 A * 7/1969 Vosbikian ................. B25F 1/00 81/437
6,038,946 A * 3/2000 Jackson .............. B25B 23/0021 81/177.2
6,922,887 B1 * 8/2005 Keswani .............. H01R 43/033 29/757
10,166,657 B2 * 1/2019 Cummings ........... B25B 13/102
2010/0005932 A1 * 1/2010 Young ..................... B25B 13/02 81/124.5

* cited by examiner

*Primary Examiner* — Hadi Shakeri

(57) ABSTRACT

Described herein is a multipurpose rotational tool. The multipurpose rotational tool comprises a screwdriver and a wire nut driver. The screwdriver defines a longitudinal axis. The wire nut driver being coaxially and slideably positioned over at least a portion of the screwdriver. In a first configuration, the wire nut driver is unlocked from the screwdriver, and slidingly and rotatably positioned proximal to a rear end of the screwdriver. In a second configuration, the wire nut driver is slidingly and rotatably positioned proximal to a front end of the screwdriver, and locked thereon.

16 Claims, 6 Drawing Sheets

MULTIPURPOSE ROTATIONAL TOOL

FIELD OF INVENTION

The present disclosure relates to a multipurpose rotational tool for performing multiple functions. More particularly, the present invention relates to the multipurpose rotational tool deploying a first elongated fastener driver and a second fastener driver, such that the first elongated fastener driver is operable in a first configuration, while the second fastener driver is operable in a second configuration.

BACKGROUND OF THE INVENTION

This section is intended to provide information relating to the field of the invention and thus, any approach or functionality described below should not be assumed to be qualified as prior art merely by its inclusion in this section.

Various rotational fastening tools are known in the tooling industry, to perform various fastening operations. For example, a screwdriver is known to tighten and/or loosen screws (referred to as 'screwdriver operations'), while a wire nut driver tool employs a wire nut to twist and join electrical wires (referred to as 'wire twisting operations'). In particular, for performing screwdriver operations, a screwdriver may be employed, wherein the screwdriver may be mated with one or more screws and further rotated in a clockwise or anti-clockwise direction, to tighten and/or loosen the one or more screws. Furthermore, for performing wire twisting operations, a wire nut driver (small plastic conical fastener) may be employed, wherein the wire nut driver receives a wire nut and the wires are inserted within the wire nut, and the wire nut driver is rotated, to twist and connect the wires together with each other.

An electrician may use the aforementioned rotational tools, along with a motorized rotary machine, such that one of the aforementioned rotational is coupled with the motorized rotary machine to be rotated thereby, for performing their respective fastening operations. Accordingly, an electrician may require to carry both the aforementioned rotational tools, for example both of the screwdriver and the wire nut driver, for carrying out their respective fastening operations. In certain situations, both the rotational tools, i.e. the screwdriver and the wire nut driver, are required to be used alternately. In such situations, the electrician may couple the screwdriver with the motorized rotary machine, for carrying out screwdriver operations. Later, the electrician may decouple the screwdriver, and couple the wire nut driver with the motorized rotary machine, for carrying out wire twisting operations. Such rotational tools and its operation is as disclosed in U.S. Pat. No. 4,823,650. However, with use of such rotational tools, the electrician is required to carry both the rotational tools. Also, a method of operating both the rotational tools is a time-consuming process. Furthermore, U.S. Patent Application US 2008/0110301 A1 describes a tool that attempts to solve the aforementioned problem, however, falls short in that the screwdriver is not integrated into the tool.

Accordingly in light of the aforementioned drawbacks and several other limitations inherent in the existing art, there is a well felt need to provide a multipurpose rotational tool, which provides assistance in performing the functions of both tools.

BRIEF SUMMARY OF THE INVENTION

This section is intended to introduce certain aspects of the disclosed system in a simplified form and is not intended to identify the key advantages or features of the present disclosure.

The present invention relates to a multipurpose rotational tool. The multipurpose rotational tool comprises a first elongated fastener driver and a second fastener driver. The first elongated fastener driver defines a longitudinal axis. The second fastener driver is coaxially and slideably positioned over at least a portion of the first elongated fastener driver. In a first configuration, the second fastener driver is slidingly and rotatably unlocked from the first elongated fastener driver, and slidingly and rotatably positioned proximal to a rear end of the first elongated fastener driver. In a second configuration, the second fastener driver is slidingly and rotatably positioned proximal to a front end of the first elongated fastener driver, and slidingly and rotatably locked thereon.

The present invention also relates to a multipurpose rotational tool. The multipurpose rotational tool comprises a screwdriver and a wire nut driver. The screwdriver defines a longitudinal axis. The wire nut driver being coaxially and slideably positioned over at least a portion of the screwdriver. In a first configuration, the wire nut driver is slidingly and rotatably unlocked from the screwdriver, and slidingly and rotatably positioned proximal to a rear end of the screwdriver. In a second configuration, the wire nut driver is slidingly and rotatably positioned proximal to a front end of the screwdriver, and slidingly and rotatably locked thereon.

BRIEF DESCRIPTION OF THE DRAWINGS

In order to explain the technical solution in the embodiments of the present application more clearly, the drawings used in the description of the embodiments will be briefly introduced below. It is obvious that the drawings in the following description are only some embodiments of the application. For those ordinarily skilled in the art, without any creative work, other drawings can be obtained based on these drawings.

DETAILED DESCRIPTION OF THE INVENTION

Figure 1A:
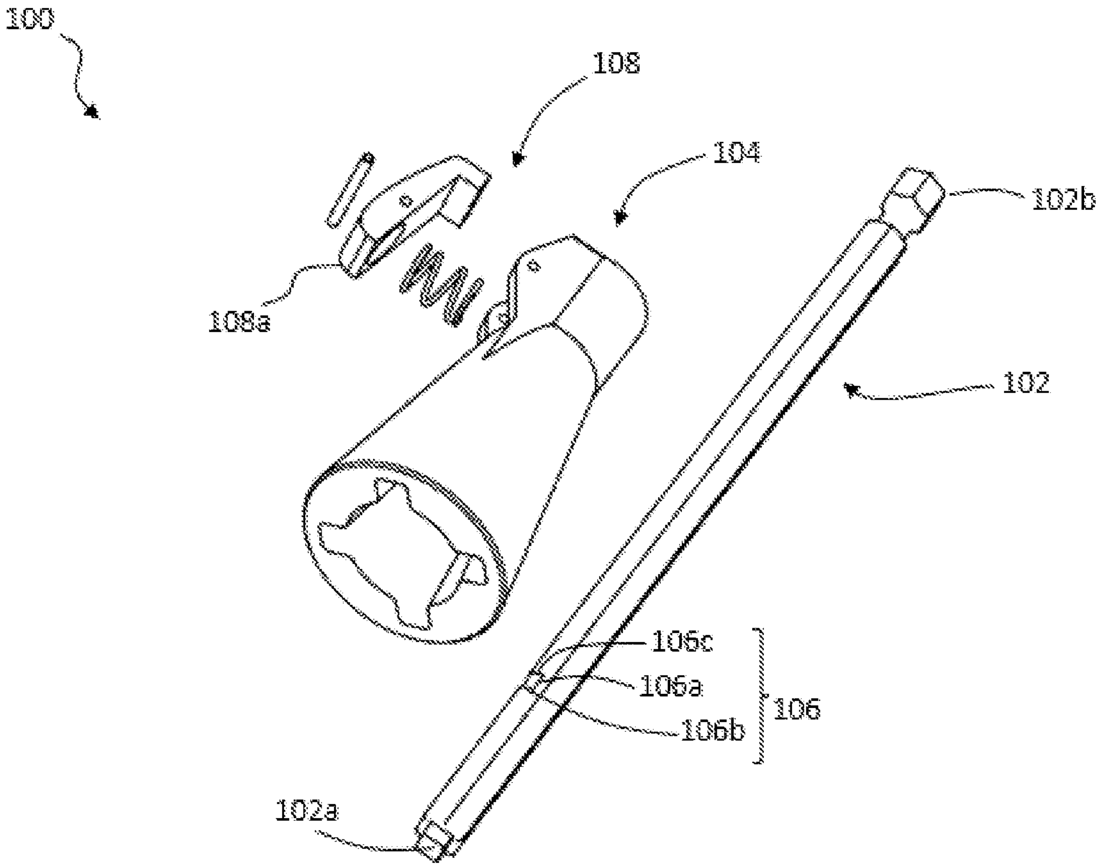
FIG. 1*a* shows an exploded view of a first embodiment of the multipurpose rotational tool, in accordance with the concepts of the present disclosure.
Figure 1B:
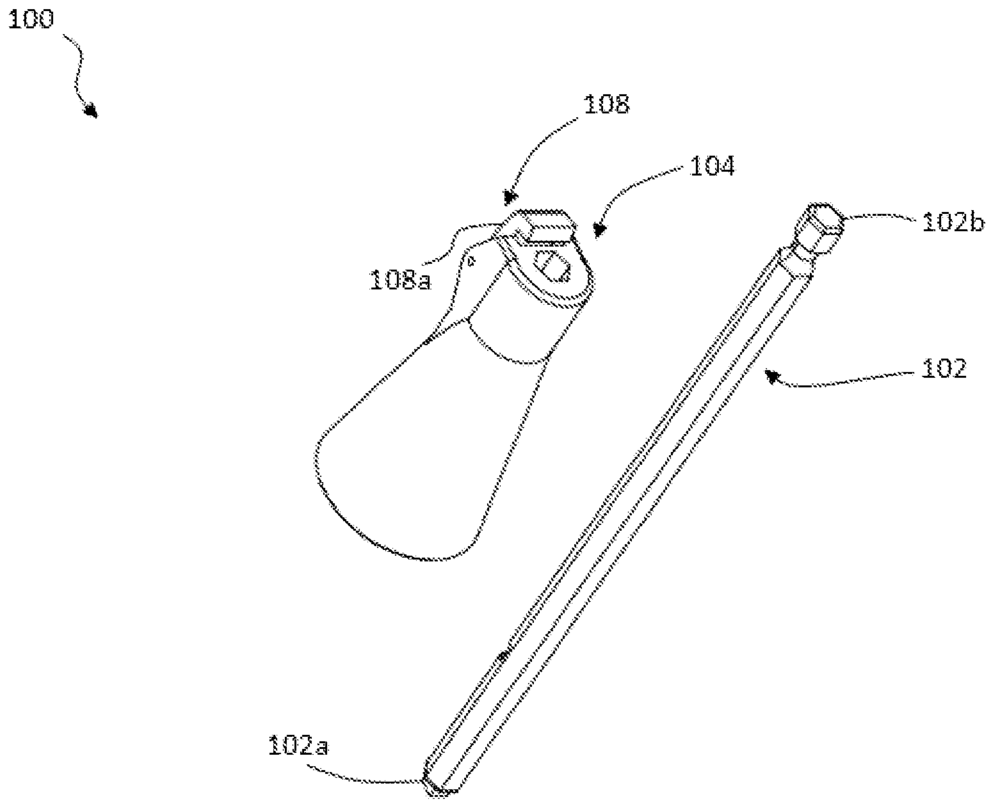
FIG. 1*b* shows a perspective view of the first embodiment of the multipurpose rotational tool, in accordance with the concepts of the present disclosure.
Figure 1C:
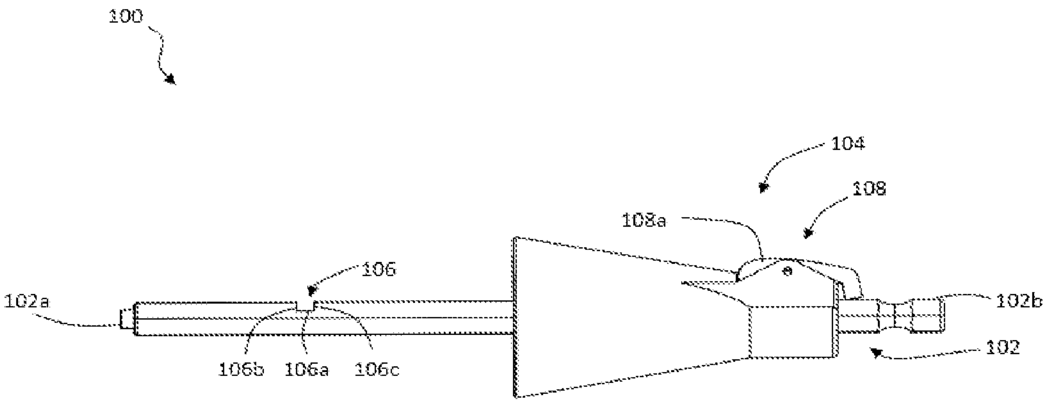
FIG. 1*c* shows a side view of the first embodiment of the multipurpose rotational tool, with a second fastener driver of the multipurpose rotational tool in a first configuration, in accordance with the concepts of the present disclosure.
Figure 1D:
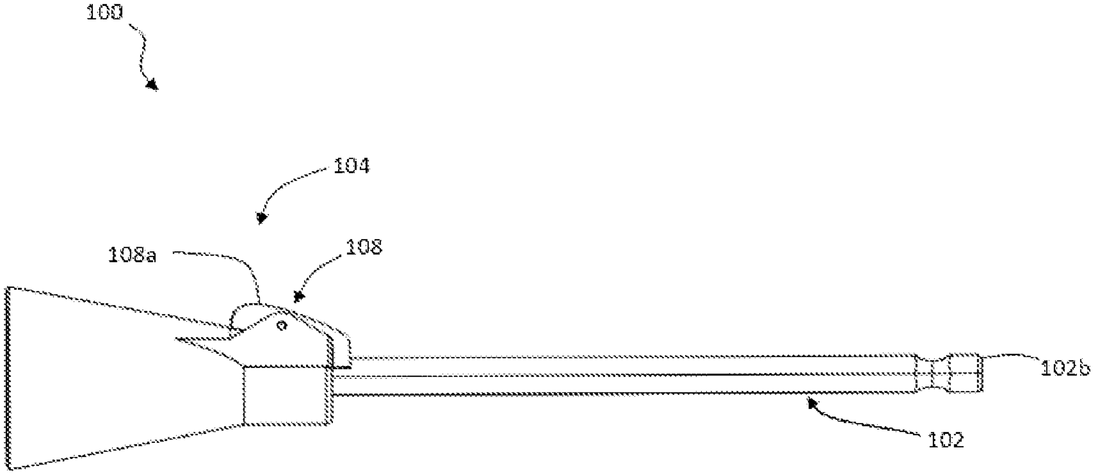
FIG. 1*d* shows a side view of the first embodiment of the multipurpose rotational tool, with a second fastener driver of the multipurpose rotational tool in a second configuration, in accordance with the concepts of the present disclosure.
Figure 1E:
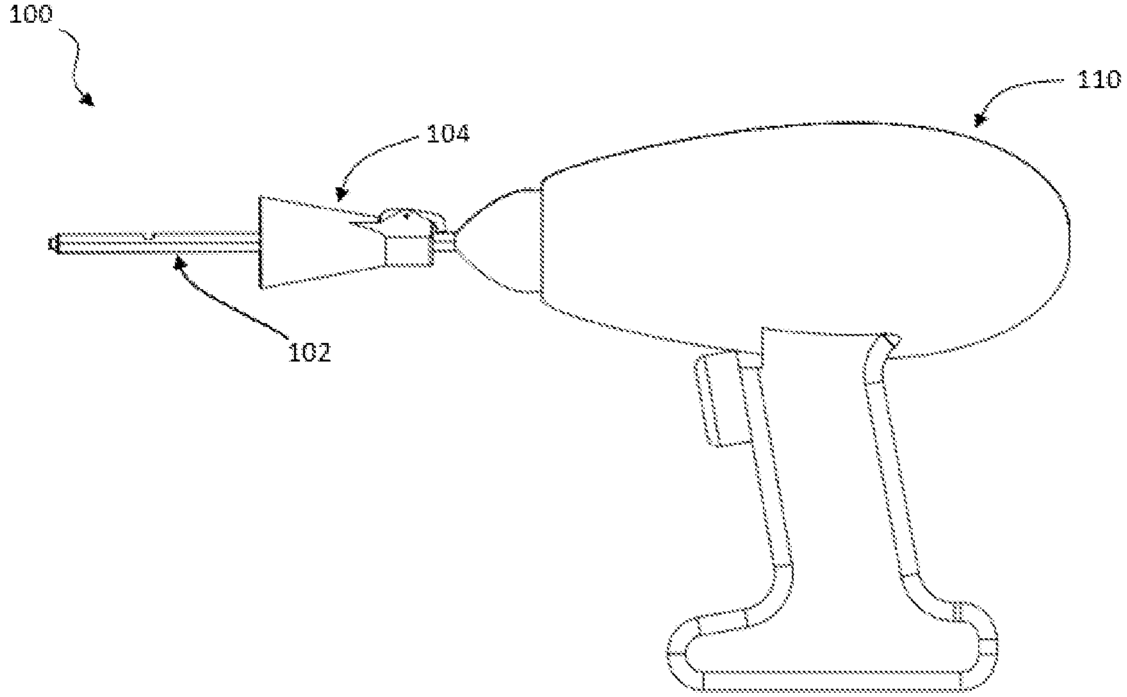
FIG. 1*e* shows a side view of the first embodiment of the multipurpose rotational tool installed on a motorized rotary machine, in accordance with the concepts of the present disclosure.

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above. Some of the problems discussed above might not be fully addressed by any of the features described herein. Exemplified embodiments of the present invention are described below, as illustrated in various drawings in which like reference numerals refer to the same parts throughout the different drawings.

Referring to FIG. 1, there is shown a multipurpose rotational tool [100] that performs dual fastening operations, of a first elongated fastener driver [102] and a second fastener driver [104]. In the present disclosure, the multipurpose rotational tool [100] is an integrated tool that comprises a combination of the first elongated fastener driver [102] and the second fastener driver [104], such that the multipurpose rotational tool [100] can be employed for dual operation in a quicker and efficient manner. The first elongated fastener driver [102] defines a longitudinal axis. The second fastener driver [104] is coaxially positioned over at least a portion of the first elongated fastener driver [102]. In a first configuration, the second fastener driver [104] is slidingly and rotatably unlocked from the first elongated fastener driver [102], and slidingly and rotatably positioned proximal to a rear end [**102*b*] of the first elongated fastener driver [102], such that the multipurpose rotational tool [100] can be used for fastening operations of the first elongated fastener driver [102]. In a second configuration, the second fastener driver [104] is positioned proximal to a front end [102*a*] of the first elongated fastener driver [102] and slidingly and rotatably locked thereon, such that the multipurpose rotational tool [100] can be used for fastening operations of the second fastener driver [104**].

Figure 2A:
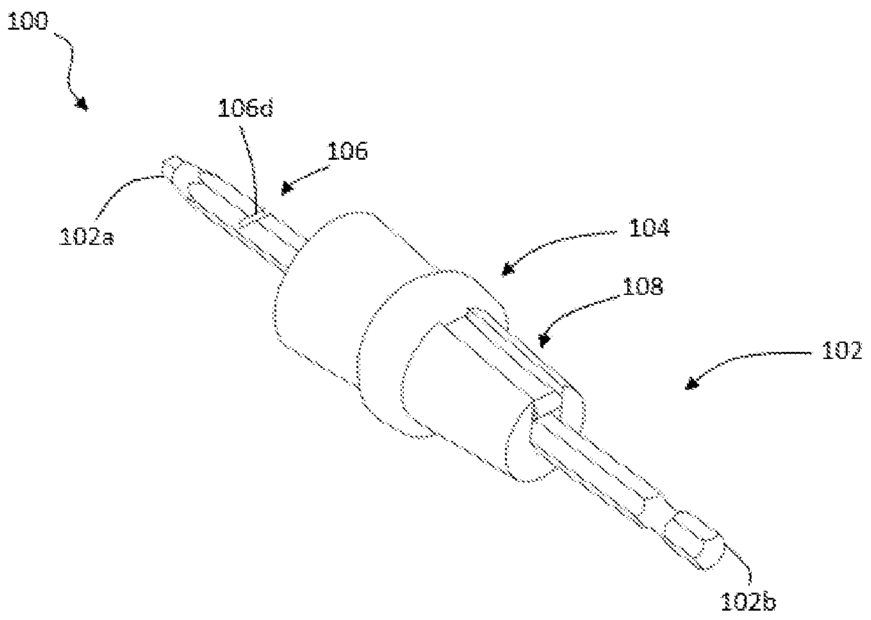
FIG. 2*a* show a perspective view of a second embodiment of the multipurpose rotational tool, in accordance with the concepts of the present disclosure.
Figure 2B:
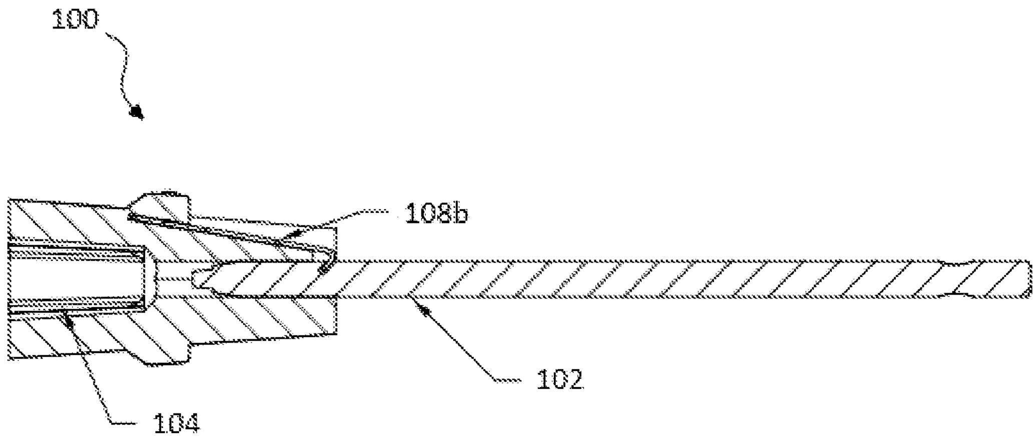
FIG. 2*b* show a sectional view of the second embodiment of the multipurpose rotational tool, with the second fastener driver of the multipurpose rotational tool in a first configuration, in accordance with the concepts of the present disclosure.
Figure 2C:
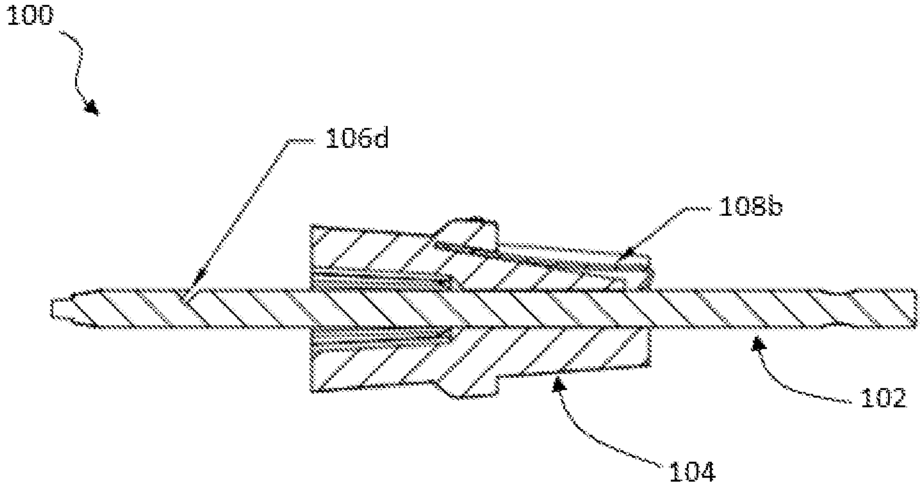
FIG. 2*c* show a sectional view of the second embodiment of the multipurpose rotational tool, with the second fastener driver of the multipurpose rotational tool in a second configuration, in accordance with the concepts of the present disclosure.

In a preferred embodiment, the first elongated fastener driver [102] is a screwdriver [102]. Details of the preferred embodiment of the first elongated fastener driver [102] being used as the screwdriver [102], will be explained later in details. The first elongated fastener driver [102] includes the front end [**102*a*] and the second end [102*b*], such that each of the front end [102*a*] and the rear end [102*b*] of the first elongated fastener driver [102] define a driver feature, such that the first elongated fastener driver [102] can be used reversely. The first elongated fastener driver [102] defines a notch portion [106] proximal to the front end [102*a*] thereof. In a first embodiment of the multipurpose rotational tool [100], as shown in FIGS. 1*a*-1*e*, the notch portion [106] is formed, such that it defines a floor [106*a*], a first wall [106*b*] extending perpendicularly from the floor, and a second wall [106*c*] defined inclined relative to the floor [106*a*]. In a second embodiment of the multipurpose rotational tool [100], as shown in FIGS. 2*a*-2*c*, the notch portion [106] is an inclined notch portion [106*d*]. Although, the present disclosure is described as the first elongated fastener driver [102] being the screwdriver [102], it may be obvious to a person skilled in the art that the first elongated fastener driver [102**] may embody any other driver tool, such as but not limited to, a Philips head fastener driver, a Robertson fastener driver, a hex & flat fastener driver, a nut fastener driver, and the like.

In a preferred embodiment, the second fastener driver [104] is a wire nut driver [104]. Details of the preferred embodiment of the second fastener driver [104] being used as the wire nut driver [104], will be explained later in details. The second fastener driver [104] includes a latch mechanism [108], for slidingly and rotatably locking and/or unlocking of the second fastener driver [104] onto the first elongated fastener driver [102]. The second fastener driver [104] includes the latch mechanism [108], for slidingly and rotatably locking and/or unlocking of the second fastener driver [104] onto the first elongated fastener driver [102], in the longitudinal direction. In a first embodiment, as shown in FIGS. **1*a*-1*e*, the latch mechanism [108] includes a latch lever member [108*a*] resiliently and pivotally installed on the second fastener driver [104], such that the latch lever member [108*a*] engages with the notch portion [106] defined proximal to the front end [102*a*] of the first elongated fastener driver [102] for slidingly and rotatably locking the second fastener driver [104] to the first elongated fastener driver [102], while the latch lever member [108*a*] disengages from the notch portion [106] for slidingly and rotatably unlocking the second fastener driver [104] from the first elongated fastener driver [102]. In a second embodiment, as shown in FIGS. 2*a*-2*c*, the latch mechanism [108] includes a dog/pawl member [108*b*] resiliently and pivotally installed on the second fastener driver [104], such that the dog/pawl member [108*b*] engages with the notch portion [106] defined proximal to the front end [102*a*] of the first elongated fastener driver [102] for slidingly and rotatably locking the second fastener driver [104] to the first elongated fastener driver [102], while the dog/pawl member [108*b*] disengages from the notch portion for slidingly and rotatably unlocking the second fastener driver [104] from the first elongated fastener driver [102]. The second fastener driver [104] deploying the latch mechanism including the dog/pawl member [108*b***], is capable of being manufactured by 3D printing technique.

With such arrangement, the multipurpose rotational tool [100] can be operated in each of the first configuration and the second configuration. In the first configuration, the second fastener driver [104] is slidingly and rotatably unlocked from the first elongated fastener driver [102], and positioned proximal to the rear end [**102*b*] of the first elongated fastener driver [102], such that the multipurpose rotational tool [100] can be used for fastening operations of the first elongated fastener driver [102]. In a second configuration, the second fastener driver [104] is positioned proximal to the front end [102*a*] of the first elongated fastener driver [102] and slidingly and rotatably locked thereon, such that the multipurpose rotational tool [100] can be used for fastening operations of the second fastener driver [104**].

It may be noted that the first elongated fastener driver [102] is capable of interfacing with a motorized rotary machine [110], such that the first elongated fastener driver [102] is power rotated by the same. The motorized rotary machine [110] may embody, such as but not limited to, a motorized screwdriver, a motorized drill, and/or a motorized impact driver. Particularly, the rear end [**102*b*] of the first elongated fastener driver [102] is capable of interfacing with the motorized rotary machine, to enable rotation of the first elongated fastener driver [102]. Accordingly, the multipurpose rotational tool [100**] can be power operated in each of the first configuration and the second configuration.

Preferred Embodiment

In the preferred embodiment of the multipurpose rotational tool [100], the first elongated fastener driver [102] is the screwdriver [102], while the second fastener driver [104] is the wire nut driver [104]. Particularly, in the preferred embodiment, the multipurpose rotational tool [100] comprises the screwdriver [102] and a wire nut driver [104]. In the present disclosure, the multipurpose rotational tool [100] is an integrated tool that comprises a combination of the screwdriver [102] and the wire nut driver [104], such that the multipurpose rotational tool [100] can be employed for dual operation in a quicker and efficient manner. The screwdriver [102] defines the longitudinal axis. The wire nut driver [104] is coaxially positioned over at least a portion of the screwdriver. In the first configuration, the wire nut driver [104] is slidingly and rotatably unlocked from the screwdriver [102], and slidingly and rotatably positioned proximal to the rear end [102*b*] of the screwdriver [102], such that the multipurpose rotational tool [100] can be used for screwdriver operations. In the second configuration, the wire nut driver [104] is slidingly and rotatably positioned proximal to the front end [102*a*] of the screwdriver [102], and slidingly and rotatably locked thereon, such that the multipurpose rotational tool [100] can be used for screw driver operations.

Notably, the screwdriver [102] defines the front end [102*a*], the rear end [102*b*], a polygonal external surface [102*c*] therebetween, and a notch portion [106] defined on the polygonal external surface [102*c*] proximal to the front end [102*a*] thereof. In the first embodiment, as shown in FIGS. 1*a*-1*e*, the notch portion [106] defines the floor [106*a*], the first wall [106*b*] extending perpendicularly from the floor [106*a*], and the second wall [106*c*] defined inclined relative to the floor [106*a*]. In the second embodiment, as shown in FIGS. 2*a*-2*c*, the notch portion includes an inclined notch portion [106*d*].

Further, a structure and arrangement of the wire nut driver [104] is similar to a conventionally known wire nut driver [104]. In the present embodiment, the wire nut driver [104] includes an external shroud member [104*a*] defining a central through-cavity through which the screwdriver [102] extends, to be coaxially positioned over at least the portion of the screwdriver [102]. Notably, the central through-cavity in the wire nut driver [104] has a hex-shaped mating portion that engages with a hex-shaped profile of the screwdriver [102], to rotatably lock the wire nut driver [104] to the screwdriver [102], such that the screwdriver [102] and the wire nut driver [104] rotates in unison in each of the first configuration and the second configuration. The external shroud member [104*a*] of the wire nut driver [104] defines a wire nut receiving cavity therein. The external shroud member [104*a*] of the wire nut driver [104] defines a frustoconical portion [104*b*], a cylindrical portion [104*c*] extending longitudinally from the frustoconical portion [104*c*], and two flange portions [104*d*] extending laterally from the cylindrical portion [104*c*], thereof.

Additionally, the wire nut driver [104] includes a latch mechanism [108], for slidingly and rotatably locking and/or unlocking of the wire nut driver [104] onto the screwdriver [102], in the longitudinal direction. In the first embodiment, as shown in FIGS. 1*a*-1*e*, the latch mechanism [108] comprises a latch lever member [108*a*] resiliently and pivotally installed on the two flange [104*d*] portions of the external shroud member [104*a*], such that the latch lever member [108*a*] engages with the notch portion [106] defined proximal to the front end [102*a*] of the first elongated fastener driver [102] for slidingly and rotatably locking the second fastener driver [104] to the first elongated fastener driver [102], while the latch lever member [108*a*] disengages from the notch portion [106] for slidingly and rotatably unlocking the second fastener driver [104] from the first elongated fastener driver [102]. In the second embodiment, as shown in FIGS. 2*a*-2*c*, the latch mechanism [108] includes a dog/pawl member [108*b*] resiliently and pivotally installed on the second fastener driver [104], such that the dog/pawl member [108*b*] engages with the notch portion [106] defined proximal to the front end [102*a*] of the first elongated fastener driver [102] for slidingly and rotatably locking the second fastener driver [104] to the first elongated fastener driver [102], while the latch lever member [108*a*] disengages from the notch portion [106] for slidingly and rotatably unlocking the second fastener driver [104] from the first elongated fastener driver [102].

With such arrangement, the multipurpose rotational tool [100] can be operated in each of the first configuration and the second configuration. In the first configuration, the second fastener driver [104] is slidingly and rotatably unlocked from the first elongated fastener driver [102], and positioned proximal to the rear end [102*b*] of the first elongated fastener driver [102], such that the multipurpose rotational tool [100] can be used for screwdriver operations. Particularly, in the first configuration of the multipurpose rotational tool [100], the screwdriver [102] is capable of engaging with a screw for screwing/unscrewing the same from another component upon rotation as the screwdriver [102] is rotated. In the second configuration, the second fastener driver [104] is positioned proximal to the front end [102*a*] of the first elongated fastener driver [102] and slidingly and rotatably locked thereon, such that the multipurpose rotational tool [100] can be used for fastening operations of the second fastener driver [104]. Particularly, in each of the first configuration and the second configuration of the multipurpose rotational tool [100], the wire nut driver [104] is rotatably locked to the screwdriver [102], such that the wire nut driver [104] and the screwdriver [102] are rotated in unison. Accordingly, in the second configuration of the multipurpose rotational tool [100], the wire nut driver [104] is capable of receiving a wire nut therein, while the wire nut is capable of receiving two or more wires therein, such that the wire nut twists and connects the two or more wires as the wire nut driver [104] and the screwdriver [102] are rotated in unison. Notably, in one embodiment, the wire nut deploys an embedded magnet or frictional element to prevent the wire nut from sliding easily out of the wire nut receiving cavity.

It may be noted that the screwdriver [102] is capable of interfacing with a motorized rotary machine [110], such that the screwdriver [102] is power rotated by the same. The motorized rotary machine [110] may embody, such as but not limited to, a motorized screwdriver, a motorized drill, and/or a motorized impact driver. Particularly, the rear end [102*b*] of the screwdriver [102] is capable of interfacing with the motorized rotary machine, to enable rotation of the screwdriver [102]. Accordingly, the multipurpose rotational tool [100] can be power operated in each of the first configuration and the second configuration.

A method of using the multipurpose rotational tool [100], comprises: sliding the wire nut driver [104] onto the screwdriver [102] towards the rear end [102*b*] thereof, to adjust the multipurpose rotational tool [100] to a first configuration; rotating the screwdriver [102] in the first configuration, such that the screwdriver [102] can be engaged with a screw for screwing/unscrewing the same from another component; sliding the wire nut driver [104] onto the screwdriver [102] towards the front end [102*a*] thereof to be locked thereon, to adjust the multipurpose rotational tool [100] to a second configuration; and rotating the wire nut driver [104] and the screwdriver [102] in unison in the second configuration, such that the wire nut driver [104] can receive a wire nut therein, while the wire nut can receive two or more wires therein, to enable the wire nut to twists and connects the two or more wires thereof.

Various advantages of the presently disclosed multipurpose rotational tool [100], are disclosed. One such advantage relates to use of the multipurpose rotational tool [100] for multiple operation, i.e. for screwing operations as well as wire twisting operations. As the multipurpose rotational tool [100] is an integrated tool, it can be used for the aforementioned multiple operations. Additionally, the electrician is not required to completely remove the multipurpose rotational tool [100] from the motorized rotary machine [110], for dual operations. This substantially reduces the operation time, for operating the multipurpose rotational tool [100], in each of the screwing operations as well as wire twisting operations. Moreover, there are less chances of loss of the multipurpose rotational tool [100], during its use.

LIST OF COMPONENTS

100—Multipurpose Rotational Tool
102—'First Elongated Fastener Driver' or 'Screwdriver'
104—'Second Fastener Driver' or 'Wire Nut Driver'
102*a*, 102*b*, 102*c*—Front End, Rear End, External Surface of 102
104*a*—External Shroud Member of 104
104*b*—Frustoconical Portion
104*c*—Cylindrical Portion
104*d*—Flange Portions
106—Notch Portion
106*a*, 106*b*, 106*c*—Floor, First Wall, Second Wall of 106
106*d*—Inclined Notch portion of 106
108—Latch Mechanism
108*a*—Latch Lever Member of 108
108*b*—Dog/pawl member of 108*b*
110—Motorized Rotary Machine of 110

I claim:

1. A multipurpose rotational tool, comprising:

a first elongated fastener driver defining a hexagonal shaft having a longitudinal axis and a notch portion proximal to a front end thereof; and a second fastener driver being coaxially and slideably positioned over at least a portion of the first elongated fastener driver, the second fastener driver having a conical shape with an engaging first end for driving a workpiece and a narrow second end defining a hexagonal opening for mounting on the hexagonal shaft;

wherein in a first configuration, the second fastener driver is slidingly unlocked from the first elongated fastener driver, and positioned proximal to a rear end of the first elongated fastener driver, wherein in a second configuration, the second fastener driver is positioned proximal to the front end of the first elongated fastener driver, and slidingly and rotatably locked thereon at said notch;

wherein the second fastener driver includes a latch mechanism, for slidingly locking or unlocking of the second fastener driver onto the first elongated fastener driver, along the longitudinal direction; and wherein the latch mechanism comprising a latch lever member resiliently installed on the narrow end of the second fastener driver biased by a spring to pivot inwardly toward the hexagonal shaft, such that the latch lever member engages with the notch portion defined proximal to the front end of the first elongated fastener driver for slidingly and rotatably locking the second fastener driver to the first elongated fastener driver, while the latch lever member disengages from the notch portion for slidingly unlocking the second fastener driver.

2. The multipurpose rotational tool as claimed in claim 1, wherein the latch mechanism includes a dog/pawl member, such that the dog/pawl member engages with the notch portion defined proximal to the front end of the first elongated fastener driver for slidingly and rotatably locking the second fastener driver to the first elongated fastener driver; while the dog/pawl member disengages from the notch portion for slidingly unlocking the second fastener driver from the first elongated fastener driver.

3. The multipurpose rotational tool as claimed in claim 1, wherein each of the front end and the rear end of the first elongated fastener driver define a driver feature.

4. The multipurpose rotational tool as claimed in claim 1, wherein the second fastener driver is rotatably locked with the first fastener driver, in each of the first configuration and the second configuration.

5. The multipurpose rotational tool as claimed in claim 1, wherein the conical shape defines an external shroud member defining the hexagonal opening through which the screwdriver extends, to be coaxially positioned over at least the portion of the screwdriver.

6. The multipurpose rotational tool as claimed in claim 5, wherein the external shroud member of the wire nut driver defines a wire nut receiving cavity therein.

7. The multipurpose rotational tool as claimed in claim 5, wherein the external shroud member of the wire nut driver defines a frustoconical portion, a cylindrical portion extending longitudinally from the frustoconical portion, and two flange portions extending laterally from the cylindrical portion, thereof.

8. The multipurpose rotational tool as claimed in claim 1, wherein the latch mechanism comprises a latch lever member resiliently and pivotally installed on the two flange portions of the external shroud member, such that the latch lever member engages with the notch portion defined proximal to the front end of the first elongated fastener driver for slidingly and rotatably locking the second fastener driver to the first elongated fastener driver, while the latch lever member disengages from the notch portion for unlocking the second fastener driver from the first elongated driver.

9. A multipurpose rotational tool, comprising:

a screwdriver defining a longitudinal axis, a hexagonal shaft and a notch portion proximal to a front end thereof; and a wire nut driver having a conical shape with an engaging first end for driving a wire nut and a narrow second end defining an opening for mounting on the hexagonal shaft, and being coaxially and slideably positioned over at least a portion of the screwdriver, wherein in a first configuration, the wire nut driver is unlocked from the screwdriver, and slidingly positioned proximal to a rear end of the screwdriver, and wherein in a second configuration, the wire nut driver is slidingly positioned proximal to the front end of the screwdriver, and slidingly and rotatably locked thereon at said notch;

wherein the wire nut driver includes a latch mechanism, for slidingly locking or unlocking of the wire nut driver onto the screwdriver, in a first rotational direction; and wherein the wire nut driver includes a latch mechanism, for slidingly locking or unlocking of the wire nut driver onto the screwdriver, in a first rotational direction; and wherein the latch mechanism includes a dog/pawl member resiliently installed on the narrow end of the wire nut driver resiliently biased to pivot inwardly toward the hexagonal shaft, such that the dog/pawl member engages with the notch portion defined proximal to the front end of the screwdriver for slidingly and rotatably locking the wire nut driver to the screwdriver, while the latch lever member disengages from the notch portion for slidingly unlocking the wire nut driver from the screwdriver.

10. The multipurpose rotational tool as claimed in claim 9, wherein the notch portion is defined on an external surface of the hexagonal shaft proximal to the front end thereof.

11. The multipurpose rotational tool as claimed in claim 9, wherein the rear end of the screwdriver is capable of interfacing with a motorized rotary machine.

12. The multipurpose rotational tool as claimed in claim 11, wherein the motorized rotary machine includes a motorized screwdriver, a motorized drill, and/or a motorized impact driver.

13. The multipurpose rotational tool as claimed in claim 9, wherein in the first configuration of the multipurpose rotational tool, the screwdriver is capable of engaging with a screw for screwing/unscrewing the same from another component upon rotation as the screwdriver is rotated.

14. The multipurpose rotational tool as claimed in claim 9, wherein in each of the first configuration and the second configuration of the multipurpose rotational tool, the wire nut driver is rotatably locked to the screwdriver, such that the wire nut driver and the screwdriver are rotated in unison.

15. The multipurpose rotational tool as claimed in claim 14, wherein in the second configuration of the multipurpose rotational tool, the wire nut driver is capable of receiving a wire nut therein, while the wire nut is capable of receiving two or more wires therein, such that the wire nut twists and connects the two or more wires as the wire nut driver and the screwdriver are rotated in unison.

16. The multipurpose rotational tool as claimed in claim 15, wherein the wire nut driver deploys an embedded magnet or frictional element to prevent the wire nut from sliding easily out of the wire nut receiving cavity.

* * * * *